United States Patent [19]

Shinya

[11] Patent Number: 4,677,493
[45] Date of Patent: Jun. 30, 1987

[54] PICTURE INFORMATION PROCESSING SYSTEM

[75] Inventor: Tadao Shinya, Yokohama, Japan
[73] Assignee: Victor Company of Japan, Ltd., Yokohama, Japan
[21] Appl. No.: 821,030
[22] Filed: Jan. 21, 1986
[30] Foreign Application Priority Data
  Jan. 23, 1985 [JP] Japan .................. 60-10493
[51] Int. Cl.⁴ .............................................. H04N 1/40
[52] U.S. Cl. .................................... 358/283; 358/298
[58] Field of Search ........................ 358/280, 283, 298
[56] References Cited
U.S. PATENT DOCUMENTS 3,681,650 8/1972 Koll ..................................... 358/283
3,977,007 8/1976 Berry et al. ......................... 358/283
4,122,496 10/1978 Childress et al. .................. 358/283
4,196,451 4/1980 Pellar .................................. 358/283

Primary Examiner—Edward L. Coles, Sr.
Attorney, Agent, or Firm—Ladas & Parry

[57] ABSTRACT

A picture information processing system processes a picture information so that a printing area of each of dots constituting a picture is variably set depending on printing areas of the dots surrounding each dot. The picture information processing system comprises a memory for pre-storing an optimum printing area of a dot for each of dot patterns. The optimum printing area of one dot is obtained depending on the printing areas of the dots surrounding the one dot, and the optimum printing area is obtained for each of the dot patterns which are formed by the one and the surrounding dots.

9 Claims, 14 Drawing Figures

FIG.1A

| A | E | I | M | Q | U |
|---|---|---|---|---|---|
| B | F | J | N | R | V |
| C | G | K | O | S | W |
| D | H | L | P | T | X |

FIG.1B

| 1 | 0 | 0 | 0 | 0 | 0 |
|---|---|---|---|---|---|
| 1 | 1 | 1 | 0 | 0 | 0 |
| 0 | 0 | 1 | 1 | 1 | 1 |
| 0 | 0 | 0 | 0 | 1 | 1 |

FIG.1C

| 2 | 0 | 0 | 0 | 0 | 0 |
|---|---|---|---|---|---|
| 1 | 3 | 1 | 0 | 0 | 0 |
| 0 | 0 | 1 | 3 | 2 | 2 |
| 0 | 0 | 0 | 0 | 1 | 2 |

FIG.2A

| 0 | 0 | 0 |
|---|---|---|
| 0 | 1 | 1 |
| 1 | 1 | 1 |

FIG.2B

| 0 | 0 | 0 |
|---|---|---|
| 1 | 1 | 1 |
| 1 | 1 | 1 |

FIG.2C

| 1 | 1 | 0 |
|---|---|---|
| 0 | 1 | 0 |
| 0 | 1 | 1 |

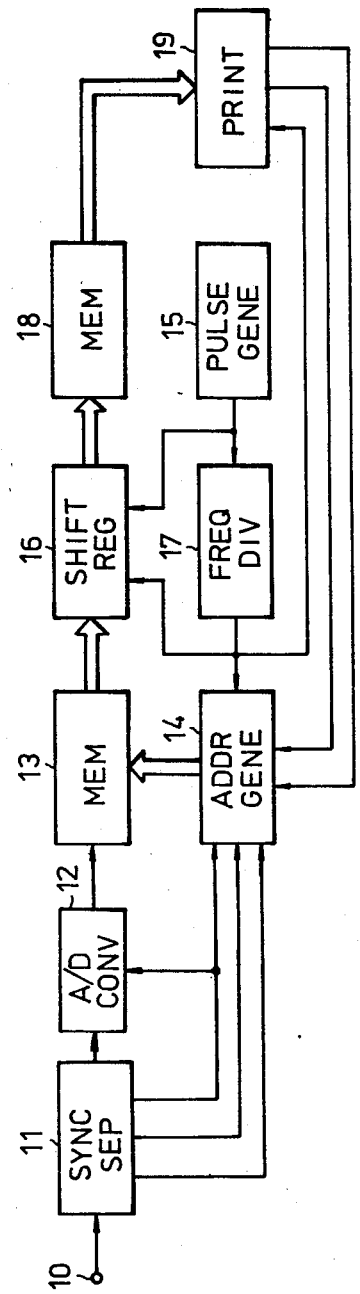

FIG.8

PICTURE INFORMATION PROCESSING SYSTEM

BACKGROUND OF THE INVENTION

The present invention generally relates to picture information processing systems, and more particularly to a picture information processing system which processes a picture information so that oblique lines and the like in a picture will not be printed as unnaturally-looking staircase lines but will be smoothened and printed as smooth lines.

Conventionally, there is a known picture information processing system for processing a picture information so that the picture information can be printed in the form of a dot matrix. However, when the picture information which is processed in the conventional picture information processing system is printed by use of an output device such as a printer, a straight oblique line in a picture, for example, will actually be printed as an unnaturally-looking staircase line. Hence, in the case where the resolution of the output device is poor, the printed picture will look unnatural.

Accordingly, in another conventional picture information processing system, picture elements constituting the picture are respectively divided into a 3×3 dot matrix, for example, and processed. In this case, data of the nine dots making up one picture element are respectively corrected depending on data of the picture elements surrounding the one picture element. In other words, the nine dots making up the one picture element are selectively printed depending on the data of the picture elements surrounding the one picture element so that even a straight oblique line in the picture, for example, is printed as a smooth straight line. According to this other conventional picture information processing system, the oblique line in the picture is smoothened to a certain extent and printed as a more naturally-looking line. However, compared to the case where one picture element is printed by use of one dot, nine dots are used in the above example to print one picture element. Thus, in the above example, it becomes necessary to employ an output device having a resolution which is three times the resolution required to print the one picture element by use of one dot. As a result, the circuit construction of a circuit which processes the picture information becomes complex, and there is a problem in that an expensive output device having a high resolution must be employed.

SUMMARY OF THE INVENTION

Accordingly, it is a general object of the present invention to provide a novel and useful picture information processing system in which the problems described heretofore are eliminated.

Another and more specific object of the present invention is to provide a picture information processing system which processes a picture information so that a printing area of each of dots constituting a picture is variably set depending on printing areas of the dots surrounding each dot. According to the picture information processing system of the present invention, even an oblique line in the picture, for example, can be smoothened and printed as a smooth naturally-looking line. In addition, in the case where an output device having the same resolution as that of an output device employed with a conventional picture information processing system is employed, it is possible to obtain a picture which looks extremely smooth and natural compared to the picture obtained in the conventional case. In other words, it is possible to print a satisfactory picture which does not look unnatural, without employing an output device having a high resolution. In such a case where an output device not having a high resolution is employed, the circuit construction of a circuit which processes the picture information becomes simple.

Still another object of the present invention is to provide a picture information processing system which comprises memory means for pre-storing an optimum printing area of a dot for each of dot patterns. The optimum printing area of one dot is obtained depending on printing areas of the dots surrounding the one dot, and the optimum printing area is obtained for each of the dot patterns which are formed by the one and the surrounding dots. According to the picture information processing system of the present invention, the optimum printing area of the one dot is read out from the memory means depending on the dot pattern formed by the one and the surrounding dots. Hence, it is possible to print a satisfactory picture which does not look unnatural by use of a circuit having a simple circuit construction.

Other objects and further features of the present invention will be apparent from the following detailed description when read in conjunction with the accompanying drawings.

BRIEF DESCRIPTION OF THE DRAWINGS

FIGS. 1A through 1C are diagrams for respectively explaining an arrangement of picture elements (dots) constituting a picture, data of the dots, and printing areas of the dots;

FIGS. 2A through 2C are diagrams for respectively explaining a method of determining a printing area of a center dot according to a dot pattern formed by the center and surrounding dots;

FIG. 6 is a system block diagram showing an embodiment of the picture information processing system according to the present invention;

FIG. 8 shows an embodiment of contents of a table stored in a read only memory within the block system shown in FIG. 7; and FIG. 9 is a diagram for explaining an application of the present invention to a system which divides one picture element into a plurality of dots and prints the one picture element by selectively printing the plurality of dots.

DETAILED DESCRIPTION

Figure 3:
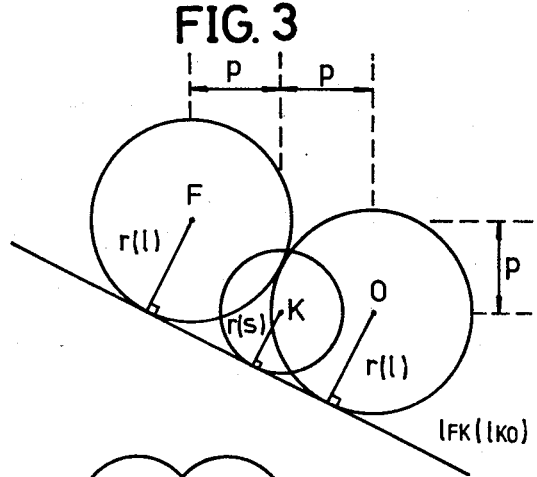
FIGS. 3 and 4 are diagrams for respectively explaining combinations of dots having different diameters.

FIG. 1A shows a part of a picture which is to be printed, and in FIG. 1A, picture elements (dots) A through X which constitute a part of the picture are represented by square blocks for convenience' sake. FIG. 1B shows an example of the dots which are to be printed in correspondence with FIG. 1A, and in FIG.

1B, the dots which are to be printed are represented by "1" and the dots which are not to be printed are represented by "0". When it is assumed that the printing areas of the dots which are to be printed are constant, an unwanted gap may be formed between adjacent dots, and moreover, an oblique line in the picture will be printed as an unnaturally-looking staircase line. As a result, the printed picture will look unnatural. Thus, in the picture information processing system according to the present invention, the printing area of each dot is variably set depending on a dot pattern which is formed by each dot and the dots surrounding each dot.

The present inventor obtained by simulations performed on a simulator how the area of a center dot should be set depending on the dot pattern which is formed by the center and the surrounding dots. When it is assumed for convenience' sake that each dot has one of four possible printing areas which are a large area, a medium area, a small area, and zero, it was found by the simulation that an oblique line in the picture is smoothened and a naturally-looking printed picture is obtainable when a center dot in a dot pattern shown in FIG. 2A has the small printing area. In the case of a dot pattern shown in FIG. 2B, it was found that an unwanted gap will not be formed between adjacent dots and a naturally-looking printed picture is obtainable when the center dot has the medium printing area. In addition, in the case of a dot pattern shown in FIG. 2C, it was found that a naturally-looking printed picture is obtainable when the center dot has the large printing area. Similarly, an optimum printing area of the center dot was obtained for all of the dot patterns.

Next, description will be given with respect to the pitch (interval) and the radius of the dots. Paying attention to the dots F, K, and O in FIG. 1A, it is seen from FIG. 1B that a part connecting the dots F and O is important in smoothening the oblique line in the printed picture. A printing radius $r_F$ with which the dot F is to be printed (hereinafter simply referred to as the radius $r_F$ of the dot F) is determined by the surrounding dots A, B, C, E, G, I, J, and K. That is, the radius $r_F$ of the dot F is determined by a dot datum $d_F$=(ABC, EFG, IJK)=(110 010 011). On the other hand, a radius $r_O$ of the dot O is similarly determined by a dot datum $d_O$=(JKL NOP RST)=(110 010 011). Since the dot datum $d_F$ is equal to the dot datum $d_O$, the radius $r_F$ is equal to the radius $r_O$. When the pitch (interval) between centers of the dots is represented by p, the following equation (1) must stand in order for the dot F to make contact with the dot O.

$$r_F^2 = r_O^2 \geq [p^2 + (2p)^2]/4 \qquad (1)$$

From the above equation (1), $r_F = r_O \geq (\sqrt{5}/2)p \simeq 1.12p$, and the radii $r_F$ and $r_O$ in this case are equal to a large radius $r_{(l)}$ for obtaining the large printing area.

As shown in FIG. 3, in order to smoothen the connection between the dots F and O and the connection between the dots K and O, a common tangent $l_{FK}$ of the dots F and K and a common tangent $l_{KO}$ of the dots K and O should coincide. In order for the two tangents $l_{FK}$ and $l_{KO}$ to coincide, the following equation (2) must stand, where rK represents the radius of the dot K.

$$[(p\sqrt{2})^2 - (r_F - r_K)^2]^{\frac{1}{2}} + [p^2 - (r_O - r_K)^2]^{\frac{1}{2}} = p\sqrt{5} \qquad (2)$$

Because $r_F = r_O = (\sqrt{5}/2)p$ as described before, it is possible to obtain from the equation (2) that $r_K = (3\sqrt{5}/10)p \simeq 0.67p$, and the radius $r_K$ in this case is equal to a small radius $r_{(s)}$ for obtaining the small printing area.

Figure 4:
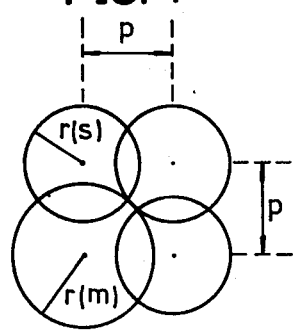

Further, a medium radius $r_{(m)}$ for obtaining the medium printing area should be selected to such a value that a gap is not formed between the adjacent dots even when three adjacent dots all have the small radius $r_{(s)}$ as shown in FIG. 4, and in this case, the following equation (3) should stand.

$$[p - (r_{(s)}^2 - (p/2)^2)^{\frac{1}{2}}]^2 + (p/2)^2 \leq r_{(m)}^2 \qquad (3)$$

From the above equation (3), $r_{(m)} > [(29-8\sqrt{5})/20]^{\frac{1}{2}}p \simeq 0.75p$.

Therefore, it is seen that a ratio of the dot radii $r_{(l)}$, $r_{(m)}$, and $r_{(s)}$ should be selected to $r_{(l)}:r_{(m)}:r_{(s)}$ 11.2:7.5:6.7.

As described heretofore, the printing area of each dot is set to the optimum printing area depending on the printing areas of the dots surrounding each dot. Hence, the dots shown in FIG. 1B are printed with the printing areas shown in FIG. 1C, for example, where "3", "2", "1", and "0" in FIG. 1C respectively represent the large, medium, small, and zero printing areas (that is, the dot radii are $r_{(l)}$, $r_{(m)}$, $r_{(s)}$, and zero).

Figure 5A:
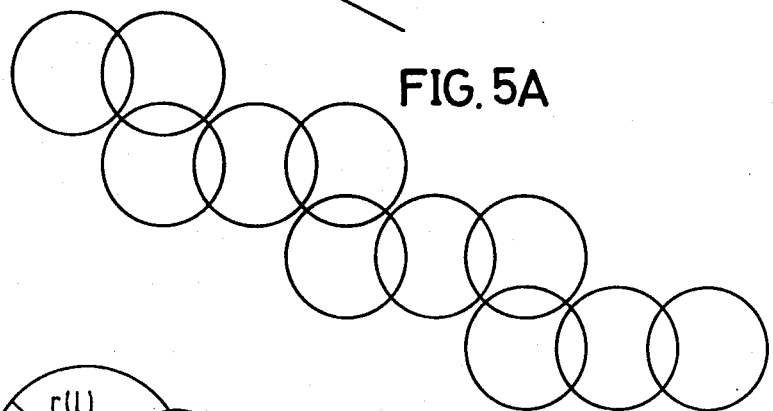
FIGS. 5A and 5B are diagrams for respectively explaining a printing of an oblique line in the picture by use of picture information processed by the picture information processing system according to the present invention.
Figure 5B:
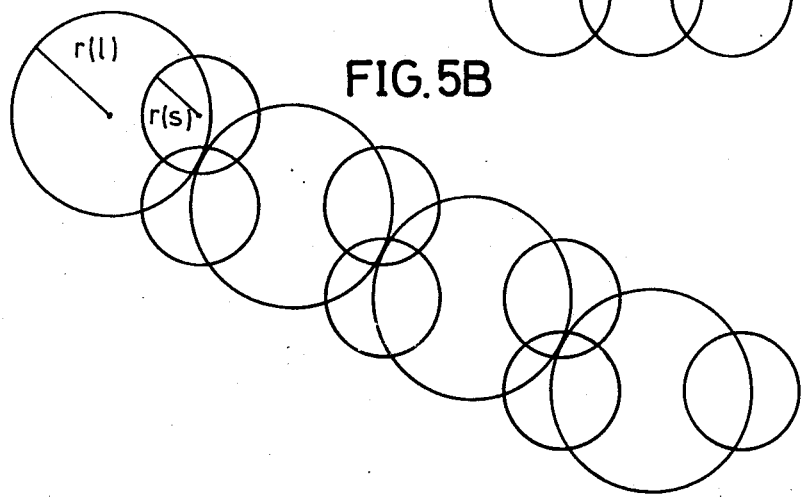

Accordingly, even the data which are printed as shown in FIG. 5A when the dots are all printed with the same printing area, are printed as shown in FIG. 5B by processing the picture information according to the picture information processing system of the present invention. As may be seen by comparing FIGS. 5A and 5B, the printing area of each dot is controlled depending on the areas of the dots surrounding each dot so that the connection of the dots is smoothened.

Next, description will be given with respect to an embodiment of the picture information processing system according to the present invention by referring to a block system shown in FIG. 6. A composite video signal is applied to an input terminal 10 and is supplied to a synchronizing signal separating circuit 11. The synchronizing signal separating circuit 11 has a known circuit construction. The synchronizing signal separating circuit 11 separates horizontal and vertical synchronizing signals from the composite video signal and also generates a predetermined clock signal based on the separated synchronizing signals. An output video signal of the synchronizing signal separating circuit 11 is supplied to an analog-to-digital (A/D) converting circuit 12 and is converted into a digital video signal which describes the picture information in a binary format. The output digital video signal of the A/D converting circuit 12 is supplied to a picture information memory 13, and the memory 13 stores the picture information corresponding to one picture, for example. On the other hand, the horizontal and vertical synchronizing signals and the clock signal from the synchronizing signal separating circuit 11 are supplied to an address generating circuit 14.

A pulse generating circuit 15 generates a first clock pulse and supplies the first clock pulse to a shift register circuit 16 and a frequency divider 17. The frequency divider 17 produces a second clock pulse by frequency-dividing the first clock pulse, and this second clock pulse is supplied to the shift register circuit 16, the address generating circuit 14, and a printer 19 which will be described later on in the specification. A page synchronizing signal and a line synchronizing signal from the printer 19 are also supplied to the address generating circuit 14. Hence, based on the horizontal and vertical synchronizing signals and the clock signal, the address generating circuit 14 successively generates write-in addresses for writing into the memory 13 the picture information corresponding to one picture, for example. On the other hand, based on the page and line synchronizing signals and the second clock pulse, the address generating circuit 15 successively generates read-out addresses for reading out from the memory 13 a datum of one dot and data of the dots surrounding the one dot. As a result, the data of the dots A, B, C, E, F, G, I, J, and K shown in FIG. 1A are successively read out from the memory 13, for example, and are supplied to the shift register circuit 16.

The shift register circuit 16 supplies the data from the memory 13 to a memory 18 as a parallel datum constituted by the data of the one and the surrounding dots. The memory 18 pre-stores therein in the form of a table the optimum printing areas of the dots which are dependent on the dot patterns and are obtained by the simulation and the calculation described before. Thus, a printing datum in the table within the memory 18 is read out from the memory 18 according to the output parallel datum of the shift register circuit 16 describing the dot pattern, and the read out printing datum is supplied to the printer 19. The printer 19 prints the dot with the printing area described by the printing datum read out from the memory 18, with a timing determined by the output second clock pulse of the frequency divider 17.

A known printer may be used for the printer 19. The printer 19 needs to have such a construction that the printing area of the dot can be controlled, that is, the printing density of the dot can be controlled. For example, a themal printer disclosed in a U.S. Pat. No. 4,536,771 may be used for the printer 19. However, the printer 19 is not limited to the thermal printer, and other types of printers may be used.

Figure 7:
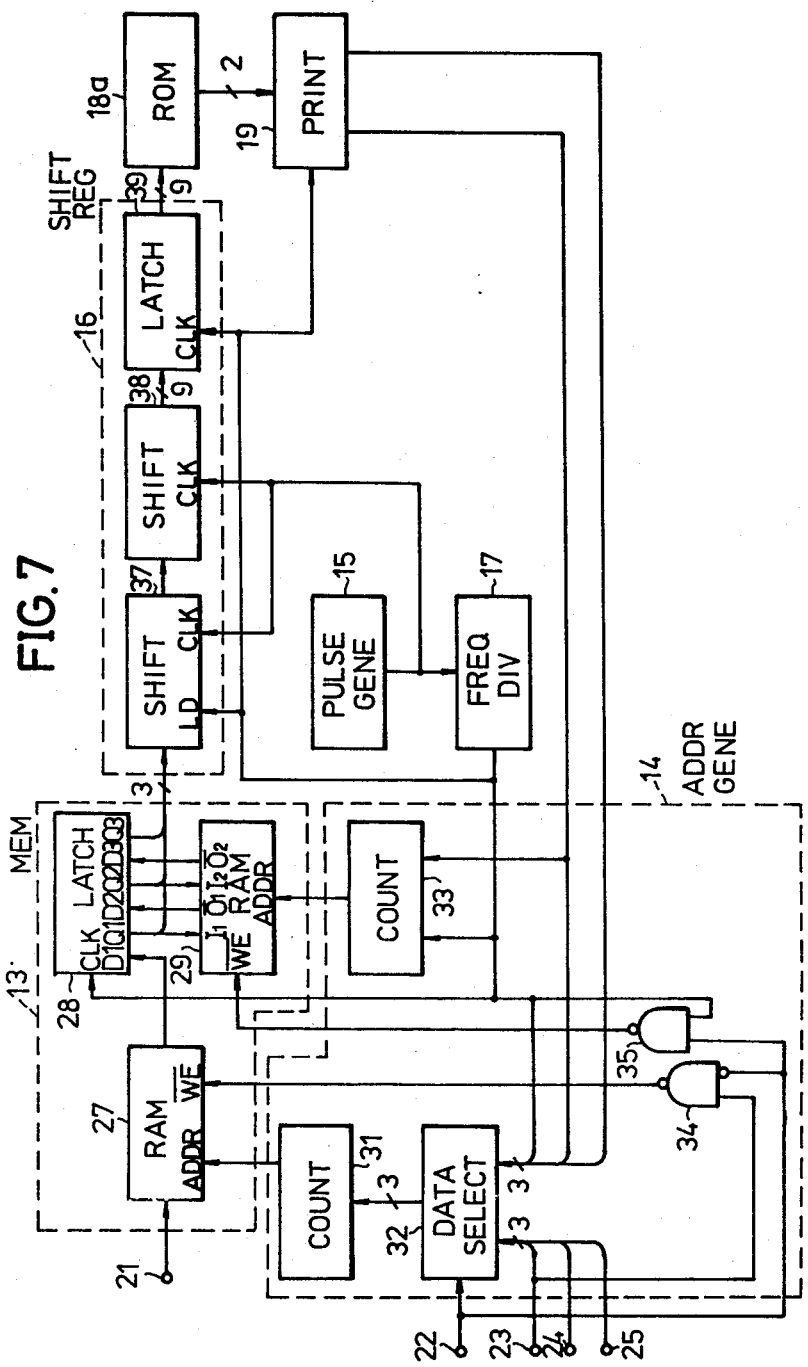
FIG. 7 is a system block diagram showing a concrete embodiment of an essential part of the block system shown in FIG. 6.

FIG. 7 shows a concrete embodiment of an essential part of the block system shown in FIG. 6. In FIG. 7, those parts which are the same as those corresponding parts in FIG. 6 are designated by the same reference numerals. The memory 13 comprises random access memories (RAMs) 27 and 29 and a latch circuit 28. The address generating circuit 14 comprises counters 31 and 33, a data selector 32, and NAND circuits 34 and 35. The shift register circuit 16 comprises shift registers 37 and 38 and a latch circuit 39. A read only memory (ROM) 18a is used for the memory 18.

For convenience' sake, it will be assumed that the printing area of one dot is determined by a 3×3 dot pattern and that the printing area of the dot is one of four kinds of printing areas which are large, medium, small, and zero. A 1-bit digital dot datum from the A/D converter 12 is applied in series to an input terminal 21. A read/write signal which indicates whether the dot datum is to be read out or written is applied to an input terminal 22. The clock signal and the horizontal and and vertical synchronizing signals from the synchronizing signal separating circuit 11 are respectively applied to input terminals 23 through 25.

When writing in the dot datum, the data selector 32 selectively supplies to the counter 31 the signals from the input terminals 23 through 25 responsive to the read/write signal. An inverted signal of the read/write signal and the clock signal from the input terminal 23 are supplied to the NAND circuit 34, and an output signal of the NAND circuit 34 is supplied to a write enable terminal $\overline{WE}$ of the RAM 27. Hence, the counter 31 supplies to an address terminal ADDR of the RAM 27 an address signal which designates the write-in address, and the dot datum from the input terminal 21 is written into the designated write-in address within the RAM 27 in synchronism with the clock signal. In this manner, the serial dot data from the input terminal 21 corresponding to one picture, for example, are stored in the RAM 27.

On the other hand, when reading out the dot datum, the data selector 32 selectively supplies to the counter 31 the second clock pulse from the frequency divider 17 and the page and line synchronizing signals from the printer 19 responsive to the read/write signal. In the present embodiment, the frequency divider 17 frequency-divides the first clock pulse from the pulse generating circuit 15 by $\frac{1}{3}$ and produces the second clock pulse. The counter 31 supplies to the address terminal ADDR of the RAM 27 an address signal which is in synchronism with the second clock pulse and designates the read-out address, and the dot datum read out from the designated read-out address within the RAM 27 is supplied to a first bit input terminal D1 of the latch circuit 28. In this state, the second clock pulse is supplied to a clock terminal CLK of the latch circuit 28, and a datum from a first bit output terminal Q1 of the latch circuit 28 is supplied to a first bit input terminal I1 of the RAM 29 and the shift register 37. In addition, the counter 33 is supplied with the second clock pulse and the line synchronizing signal, and supplies to an address terminal ADDR of the RAM 29 an address signal which designates an address within the RAM 29. The NAND circuit 35 is supplied with the read/write signal and the second clock pulse, and an output signal of the NAND circuit 35 is supplied to a write enable terminal ,ovs/WE/ of the RAM 29. Accordingly, the datum from the first bit output terminal Q1 of the latch circuit 28 is written into the the RAM 29 in synchronism with the output signal of the NAND circuit 35 at the address which is designated by the output address signal of the counter 33. At the same time, a read out datum from a first bit output terminal O1 of the RAM 29 is supplied to a second bit input terminal D2 of the latch circuit 28, and the datum from a second bit output terminal Q2 of the latch circuit 28 is supplied to a second bit input terminal I2 of the RAM 29 and the shift register 37. Similarly, the datum from the second bit output terminal O2 of the RAM 29 is supplied to a third bit input terminal D3, and the datum from a third bit output terminal Q3 of the latch circuit 28 is supplied to the shift register 37.

In the case where the datum obtained from the first bit output terminal Q1 of the latch circuit 28 is the datum $d_K$ of the dot K shown in FIG. 1A, for example, the data obtained from the second and third bit output terminals Q2 and Q3 of the latch circuit 28 are the data $d_J$ and $d_I$ of the dots J and I, respectively.

The shift register 37 is supplied with the second clock pulse to a load terminal LD thereof and is supplied with the first clock pulse to a clock terminal CLK thereof. As a result, the shift register 37 converts the 3-bit parallel datum from the latch circuit 28 into 1-bit serial data and supplies the 1-bit serial data to the shift register 38. The shift register 38 is supplied with the first clock pulse to a clock terminal CLK thereof, and hence produces a 9-bit parallel datum related to one dot and the eight surrounding dots. For example, the 9-bit parallel datum is made up of the data $d_A$ through $d_C$, $d_E$ through $d_G$, and $d_I$ through $d_K$ of the dots A through C, E through G, and I through K shown in FIG. 1A. In this case, the data of the center dot F and the and the eight surrounding dots A through C, E, G, and I through K are simultaneously obtained from the 9-bit parallel datum. The 9-bit parallel datum is supplied to the ROM 18a through the latch circuit 39 which is supplied with the second clock pulse to a clock terminal CLK thereof.

Figure 8:
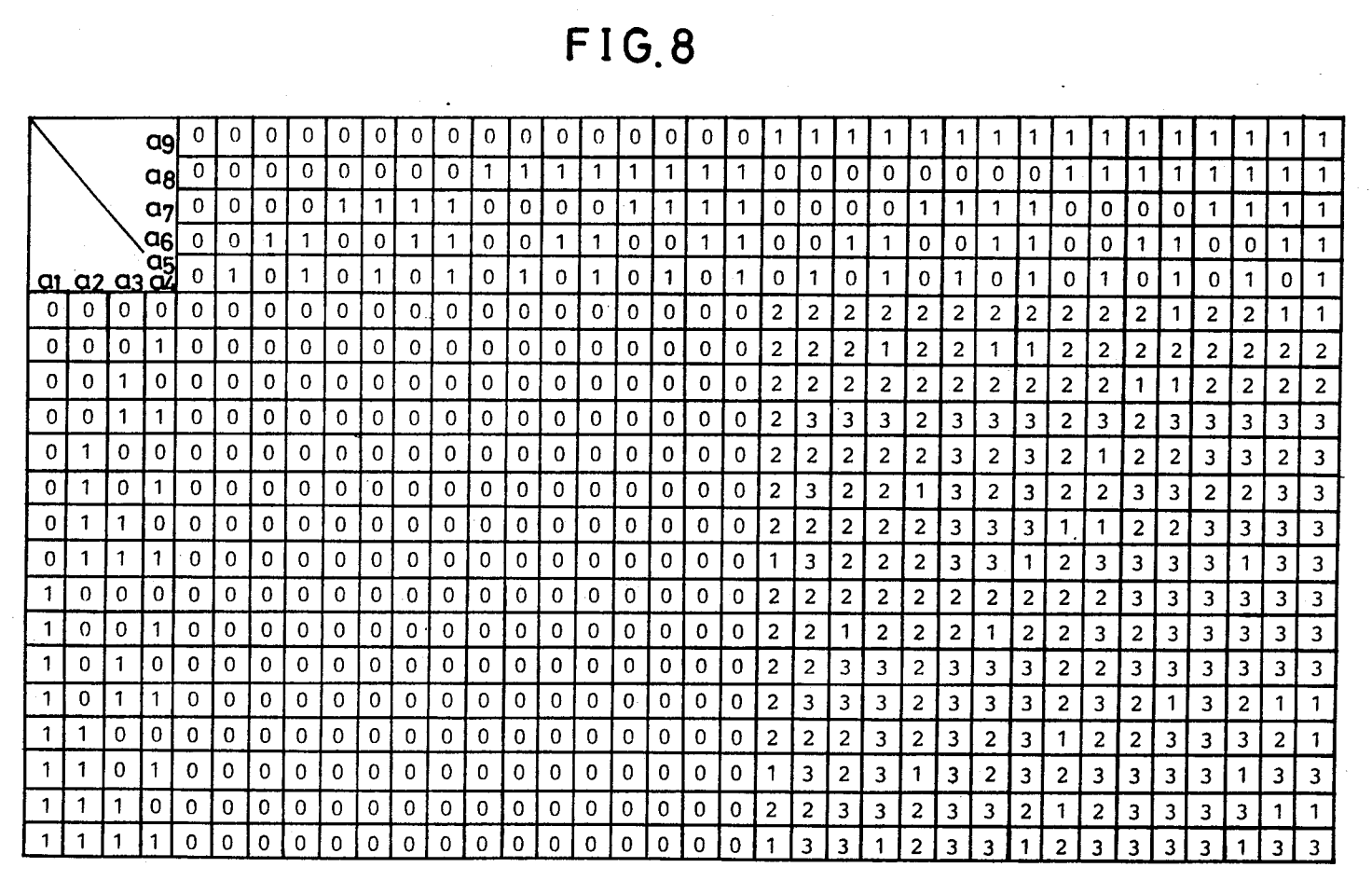

The ROM 18a pre-stores therein in the form of a table the optimum printing areas of the dots which are dependent on the dot patterns and are obtained by the simulation and the calculation described before. In other words, the table contains the optimum printing area of the center dot in the dot pattern for all of the dot patterns. An embodiment of the contents of a ROM table (the table pre-stored in the ROM 18a) for the present embodiment is shown in FIG. 8. In FIG. 8, access is made to the ROM table by designating a table address described by $a_1$ through $a_9$. In the case where the center dot is the dot F shown in FIG. 1A, the table address is designated by the data $d_A$ through $d_C$, $d_E$ through $d_G$, and $d_I$ through $d_K$ of the dots A through C, E through G, and I through K. That is, the table address ($a_1$, $a_2$, $a_3$, $a_4$, $a_5$, $a_6$, $a_7$, $a_8$, $a_9$) in this case is equal to the parallel dot datum ($d_A$, $d_B$, $d_C$, $d_E$, $d_F$, $d_G$, $d_I$, $d_J$, $d_K$). Thus, when the parallel dot datum is equal to (1, 1, 0, 0, 1, 0, 0, 1, 1) as shown in FIG. 1B, an optimum printing area "3" is read out from the ROM table for the dot F, where "3" indicates the large printing area described before.

Similarly, when the center dot is the dot J shown in FIG. 1A, the table address ($d_E$, $d_F$, $d_G$, $d_I$, $d_J$, $d_K$, $d_M$, $d_N$, $d_O$) in this case is equal to (0, 1, 0, 0, 1, 1, 0, 0, 1) in the case of the dot data shown in FIG. 1B, and an optimum printing area "1" is read out from the ROM table for the dot J, where "1" indicates the small printing area described before. When the center dot is the dot N, the table address in this case is equal to (0, 1, 1, 0, 0, 1, 0, 0, 1), and an optimum printing area "0" is read out from the ROM table for the dot N, where "0" indicates the zero printing area. Further, when the center dot is the dot S, the table address is equal to (0, 1, 0, 0, 1, 1, 0, 1, 1), and an optimum printing area "2" is read out from the ROM table, where "2" indicates the medium printing area described before. Therefore, because the optimum printing area of each dot is read out from the table within the ROM 18a and is supplied to the printer 19, it is possible to print a satisfactory picture in which no unnaturally-looking lines exist and oblique lines in the picture are smoothened as may be seen from FIG. 1C.

In the embodiments described heretofore, it is assumed that the printing area of one dot is determined by the 3×3 dot pattern which is formed by the one dot and the eight surrounding dots. However, the printing area of one dot may be determined by an m×n dot pattern such as 3×5 and 5×5 dot patterns, where m and n are odd numbers. In addition, more than four kinds of printing areas may be used for printing the dots. In this case, it is possible to further improve the smoothness with which the oblique lines in the picture are printed.

According to the picture information processing system of the present invention, in the case where an output device having the same resolution as that of an output device employed in a conventional picture information processing system is employed, it is possible to obtain a picture which looks extremely smooth and natural compared to the picture obtained in the conventional case.

In the embodiments described before, the picture elements constituting one picture are respectively printed by use of one dot. However, the present invention is also applicable to a system which divides one picture element into a matrix of a plurality of dots and describes one picture element by the dot matrix. For example, in the case where one picture element is to be divided into a 3×3 dot matrix and processed, the picture elements shown in FIG. 1A are respectively divided into the 3×3 dot matrix and printed as shown in part in FIG. 9. In this case, the picture element J is described and printed by dots J1 through J9. Hence, by determining the optimum printing area of the dot J5 according to the dot pattern formed by the dots J1 through J9 in a manner similar to that described before, each dot can be printed with the optimum printing area. In this case, a printer having a relatively high resolution is required, but on the other hand, it is possible to obtain a printed picture in which the oblique lines are extremely well smoothened.

Further, the present invention is not limited to these embodiments, but various variations and modifications may be made without departing from the scope of the present invention.

What is claimed is:

1. A picture information processing system comprising:
    first memory means supplied with data of dots constituting one picture which is to be printed for storing the data;
    address generating means for generating an address signal for reading out from said first memory means a datum of one dot and data of a predetermined number of dots surrounding said one dot, said address generating means supplying said address signal to said first memory means;
    data converting means supplied with the data read out from said first memory means for converting the read out data into a parallel datum; and
    second memory means supplied with the parallel datum from said data converting means for pre-storing a table containing printing data, said table being accessible by a table address,
    said printing data each describing an optimum printing area with which a center dot of a dot pattern formed by the center dot and the predetermined number of dots surrounding the center dot should be printed depending on the dot pattern, so that an oblique line in the picture is smoothened and printed as a smooth oblique line,
    said table containing a printing datum describing the optimum printing area with which the center dot should be printed for all of dot patterns which can be formed by the center dot and the predetermined number of surrounding dots,
    said parallel datum from the data converting means being used as said table address to make access to said table and read out from said second memory means a printing datum describing the optimum printing area with which said one dot should be printed.

2. A picture information processing system as claimed in claim 1 in which said address generating means comprises a pulse generating circuit for generating a first clock pulse, a frequency divider for producing a second clock pulse by frequency-dividing said first clock pulse, and an address generating circuit for successively generating an address signal for reading out from said first memory means the data of said one dot and said predetermined number of dots surrounding said one dot at least responsive to said second clock pulse, said data converting means converting the data read out from said first memory means into said parallel datum responsive to said first and second clock pulses.

3. A picture information processing system as claimed in claim 1 which further comprises synchronizing signal separating means supplied with a composite video signal describing the picture which is to be printed for separating synchronizing signals from the composite video signal and for supplying the separated synchronizing signals to said address generating means, and analog-to-digital converting means supplied with an output video signal of said synchronizing signal separating means for converting the video signal into a digital video signal, said digital video signal being supplied to said first memory means as the data of the dots constituting the picture which is to be printed.

4. A picture information processing system as claimed in claim 1 in which said dot pattern is formed by an m×n dot matrix, where m and n are odd numbers.

5. A picture information processing system as claimed in claim 1 in which said optimum printing area is one of four kinds of areas, said four kinds of areas is a large area, a medium area, a small area, and zero.

6. A picture information processing system as claimed in claim 1 in which each dot corresponds to one of picture elements constituting one picture.

7. A picture information processing system as claimed in claim 1 in which a dot group constituted by an N×N dot matrix corresponds to one of picture elements constituting one picture, where N is an integer.

8. A picture information processing system as claimed in claim 1 in which said second memory means comprises a read only memory.

9. A picture information processing system as claimed in claim 1 in which said first memory means comprises a random access memory for storing the data of the dots corresponding to one picture, and means supplied with the data read out from said random access memory from addresses designated by the output address signal of said address generating means and for serially supplying the read out data to said data converting means with a predetermined sequence.

* * * * *